2,933,794

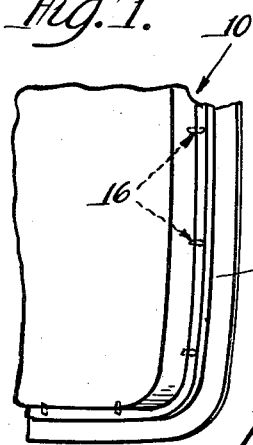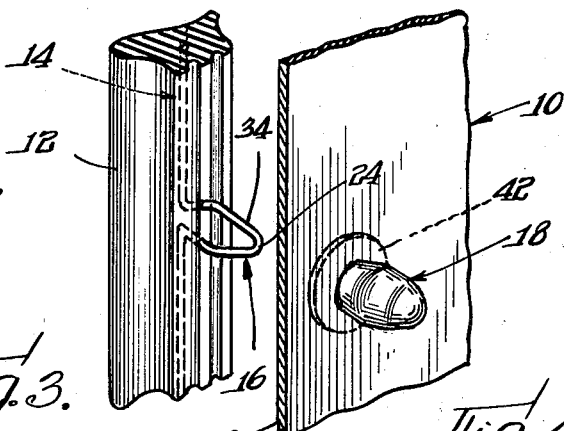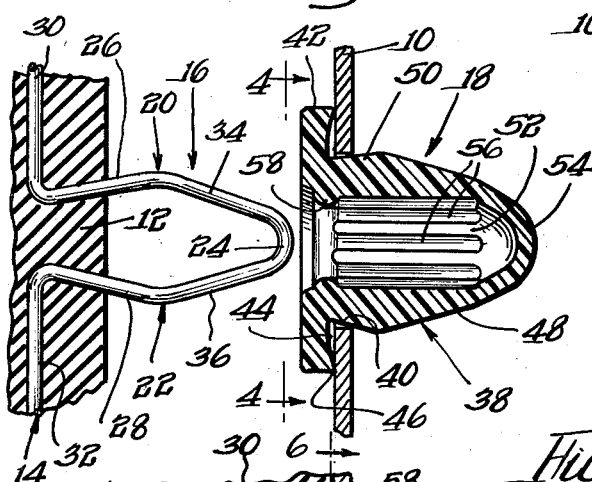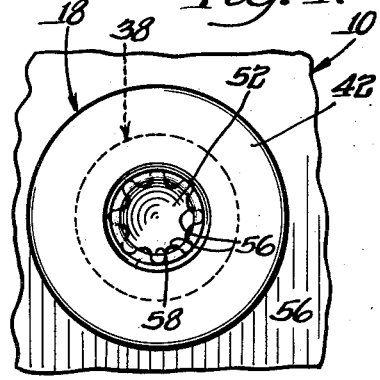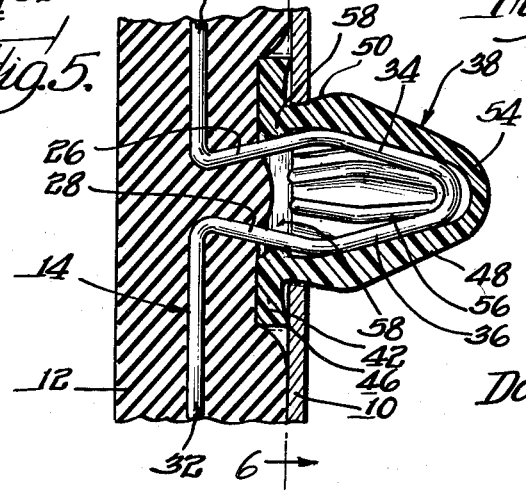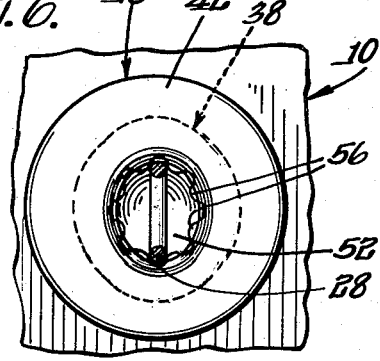
INVENTOR.
Donald L. Biesecker United States Patent Office 2,933,794
Patented Apr. 26, 1960

FASTENING MEANS FOR A RESILIENT SEALING STRIP

Donald L. Biesecker, Chicago, Ill., assignor to Illinois Tool Works, Chicago, Ill., a corporation of Illinois Application June 6, 1958, Serial No. 740,347

7 Claims. (Cl. 24—216)

The present invention relates to a novel fastener or anchor member, and more particularly to novel fastening means for securing an element to an apertured workpiece.

While various uses for fastening means incorporating features of the present invention may suggest themselves, the fastening means is particularly suitable for securing strips of resilient sealing or insulating material to margins of automobile doors and the like. In order to secure such strips of resilient or rubber material to margins of automobile doors, it has been suggested that continuous elongated wires be molded within the strips, which wires are provided with a plurality of spaced laterally projecting stud portions adapted to be inserted through apertures in margins of the doors. It has been found that such stud portions may tilt within the door or workpiece apertures with the result that portions of the wires between the stud portions may be deflected or twisted so as to cause the sealing strips to be shifted out of proper positions.

As will be understood, automobile doors are frequently provided with apertures in bottoms thereof to which any rain water and the like entering the door may escape. When, however, additional apertures are provided in the bottom of the door for accommodating the above mentioned stud portions of the sealing strip mounting wire, a portion of any water within a door may flow through such additional apertures and enter the sealing strip which may be in the form of sponge rubber and the like. When this occurs during cold or freezing weather, a water soaked sealing strip may be severely damaged or broken.

An important object of the present invention is to provide novel fastening means for mounting an elongated element or workpiece including an elongated wire and the like having a plurality of laterally projecting stud portions, which novel fastening means is adapted to resist twisting or turning of said stud portions relative to an apertured workpiece after they are applied to the apertured workpiece.

A further object of the present invention is to provide novel fastening means of the above described type which is constructed so as effectively to seal a workpiece aperture so as to prevent the passage of water, dust or any other foreign material therethrough.

A more specific object of the present invention is to provide a novel anchor member adapted to be applied securely to an apertured workpiece and adapted to receive and retain a stud element in a manner which prevents rotation of the stud element relative to the workpiece.

A further specific object of the present invention is to provide a novel anchor member of the above described type which may be economically formed in one piece from plastic material and which is constructed so as effectively to seal a workpiece aperture.

Other objects and advantages of the present invention will become apparent from the following description and the accompanying drawings wherein:

Fig. 1 is a fragmentary perspective view showing a sealing strip mounted to a margin of an automobile door in accordance with the features of the present invention;

Fig. 2 is an enlarged fragmentary perspective view showing a portion of a sealing strip in position to be applied to a workpiece and secured thereto with fastening means incorporating features of the present invention;

Fig. 3 is a further enlarged fragmentary sectional view showing a wire stud element connected with a sealing strip or other workpiece in position to be applied to an anchor member incorporating features of the present invention mounted on an apertured workpiece;

Fig. 4 is a fragmentary elevational view taken along line 4—4 in Fig. 3;

Fig. 5 is a sectional view similar to Fig. 3 but shows the elements in fully assembled relationship; and Fig. 6 is a fragmentary sectional view taken generally along line 6—6 in Fig. 5.

Referring now more specifically to the drawings wherein in like parts are designated by the same numerals throughout the various figures, a portion of a door 10 is shown to which a sealing strip 12 is applied in accordance with features of the present invention. The strip 12 is formed from rubber or any other suitable resilient material. In order to connect the strip 12 with the door 10 in accordance with the present invention, a wire 14 extends longitudinally of and is embedded within the strip 12 and is provided with a plurality of integral stud portions 16 projecting laterally outwardly of the strip at spaced intervals. The stud portions 16 are adapted to be applied to anchor members 18 constructed in accordance with the features of the present invention and mounted in properly spaced apertures formed in the door.

Each stud portion 16 has a pair of spaced apart legs 20 and 22 disposed in a common plane and integrally joined at their outer or entering ends by a curved bight portion 24. Sections 26 and 28 of the legs are flared outwardly from integral junctions with adjacent laterally projecting sections 30 and 32 respectively of the wire 14 for providing shoulder means which will resist removal of the stud portion 16 from an anchor member as will be described more fully below. Entering end sections 34 and 36 converge toward each other from integral junctions with the flaring or shoulder sections 26 and 28 for facilitating entry of the stud portion into an anchor member.

Each anchor member 18 is preferably molded in one piece from a suitable tough resilient plastic material such as nylon. The anchor member is provided with a shank portion 38 adapted to be inserted through an aperture 40 in the workpiece or door 10. A radially outwardly extending head portion 42 is integrally joined with a trailing end of the shank portion 38 for overlying and engaging an outer surface of the workpiece or door 10. It is to be noted that an under or workpiece clamping surface 44 of the head portion 42 is gradually recessed from its peripheral edge toward the shank portion. As a result, a radially narrow peripheral edge portion 46 of the clamping surface 44 will aggressively engage the outer surface of the workpiece 10 for providing a seal to prevent the flow of water or foreign material through the aperture 40 when the anchor member is fully applied to the workpiece.

The shank portion 38 has a tapering entering end portion 48 for facilitating entry thereof through the workpiece aperture 40. A section 50 of the shank portion immediately adjacent the head portion 42 has an outwardly flaring surface providing shoulder means facing generally toward the head portion for engaging behind the door or workpiece 10 and cooperating with the head portion for securely retaining the anchor member in assembled relationship with the workpiece. It is to be noted that the exterior cross sectional configuration of the shank section 50 is the same as the configuration of the aperture 40 which in the embodiment shown is circular. In addition, the transverse dimension or diameter of the shank section 50 is preferably slightly larger than the diameter of the aperture 40 so that the shank section 50 will be compressed when fully inserted into the workpiece aperture. As a result, the inherent resiliency of the plastic material from which the anchor member is formed, causes the shoulder means provided by the shank section 50 to be resiliently and aggressively urged into engagement with the margin of the workpiece aperture. Such engagement effectively prevents unauthorized withdrawal of the anchor member from the aperture 40 and also resists turning of the anchor member relative to the workpiece. The aggressive engagement of the shank section 50 with the workpiece also insures the provision of a second annular seal between the workpiece and shoulder means 50.

The anchor member 18 is provided with a bore 52 extending through the head portion 42 and a major part of the shank portion 38. However, a free entering end 54 of the shank portion is closed so as to prevent the passage of water or foreign material through the bore 52. The diameter of the bore 52 is substantially uniform throughout the major part of the shank portion 38 and is normally smaller than the greatest distance between the flaring leg sections 26 and 28 of a stud portion 16. It is to be noted that a plurality of axially extending ribs 56 is provided along the wall of the bore 52, which ribs are circumferentially spaced from each other a distance similar to the diameter of the wire 14 for the purpose described below. Upper or outer ends of the ribs 56 merge with an internal annular bead 58 which has an internal diameter similar to the diameter of a circle defined by the inner edges of the ribs 56. The bead 58 promotes a secure connection between a stud portion 16 and the anchor member 18 as will be described below.

When a sealing strip 12 or other article is to be applied to a door or apertured workpiece, an anchor member is first applied to the apertured workpiece by inserting the shank portion thereof through the workpiece aperture until the head portion 42 firmly engages the workpiece. Then the wire stud 16 is forced axially into the bore 52 of the anchor member to the position shown in Figs. 5 and 6. Since the greatest distance between the outwardly facing edges of the diverging or shoulder sections 26 and 28 of the wire stud legs is greater than the diameter of the bore 52 and the internal diameter of the bead 58, the leg portions of the stud 16 will be resiliently collapsed toward each other and the resilient plastic anchor member will be radially expanded during insertion of the stud into the anchor member. As a result, the wire stud aggressively engages the interior of the anchor member when the parts are fully assembled so as not only to resist withdrawal of the stud from the anchor member but also to urge the shoulder means of the anchor member into aggressive engagement with the apertured workpiece. As indicated best in Fig. 5, the shank portion of the anchor member is deformed and expanded in the vicinity of the anchor member shoulder means so that the interior wall of the shank portion conforms to and partially overlies and interengages with the shoulder sections 26 and 28 of the wire stud for resisting withdrawal of the stud. The bead 58 which also overlies the shoulder sections of the stud further restrains unauthorized withdrawal of the stud. As suggested above, the stud is inserted into the anchor member so that the leg portions 20 and 22 extend between pairs of adjacent ribs 56. These ribs or protuberances which are spaced apart the distance substantially equal to the diameter of the wire 14 thus serve positively to lock the wire stud against tilting or pivoting about a transverse axis relative to the anchor member, and thus twisting of the wire sections 30 and 32 along the longitudinal axes and resulting twisting of the sealing strip.

While the preferred embodiment of the present invention has been shown and described herein, many structural details may be changed without departing from the spirit and scope of the appended claims.

The invention is claimed as follows:

1. Fastening means of the type described for connecting an article to an apertured workpiece comprising a wire member including means for retaining an article and a stud portion integral with and extending from said means, and a resilient plastic anchor member for application to an apertured workpiece for receiving and retaining said stud portion, said stud portion including a pair of spaced apart resilient legs having diverging sections adjacent said means and converging entering end sections, said anchor member including a radially projecting head portion engageable with one side of an apertured workpiece, and a shank portion integral with and extending axially from said head portion for insertion through an aperture in said workpiece, said shank portion prior to receiving said stud portion including radially projecting shoulder means facing generally toward said head portion and engageable with the workpiece oppositely from said head portion when the anchor member is applied to the workpiece for preventing withdrawal of the shank portion from the workpiece aperture, said anchor member including bore means extending axially through said head portion and into said shank portion, said wire stud portion being insertable into said bore means for connecting said wire member to said anchor member, and said shank portion including pairs of elongated axially extending internal abutment means within said bore means and projecting radially inwardly from the wall of the bore means for embracing and engaging a substantial length of said stud portion for preventing the stud portion from turning relative to the anchor member.

2. Fastening means, as defined in claim 1, wherein said bore means has a portion extending past said anchor member shoulder means and having a predetermined diameter less than a normally maximum distance between outer sides of said diverging stud portion leg sections so that the diverging leg sections will engage wall means of the bore means for interconnecting the stud portion and the anchor member and for promoting engagement of the anchor member shoulder means with the workpiece.

3. Fastening means, as defined in claim 1, which includes a series of elongated ribs substantially identical to and including said pairs of abutment means uniformly spaced around said bore means, the wire of said wire member having a predetermined diameter, and the spacing between adjacent ribs being substantially equal to said diameter of the wire.

4. A one piece resilient plastic anchor member for application to an apertured workpiece for receiving and retaining a stud member having spaced apart legs, said anchor member comprising a radially projecting head portion engageable with one side of an apertured workpiece, and a shank portion integral with and extending axially from said head portion for insertion through an aperture in the workpiece, said shank portion including an exterior surface flaring outwardly from adjacent said head portion and providing laterally projecting shoulder means facing generally toward said head portion and engageable with the workpiece oppositely from said head portion when the anchor member is applied to the workpiece for preventing withdrawal of the shank portion from the workpiece aperture, said shank portion including a tapering entering end portion extending from said shoulder means, said anchor member including bore means extending axially through said head portion and into said shank portion for receiving said legs of a stud member when the stud member is applied to the anchor member, said bore means having a generally uniform diameter from a location adjacent said head portion to a location disposed axially beyond said shoulder means and then progressively decreasing in diameter toward the entering end of the shank portion, and said anchor member including elongated abutment means extending from adjacent said head portion substantially to the portion of the bore means of decreasing diameter and projecting into said bore means for engaging said legs of a stud member for preventing the stud member from turning relative to the anchor member when the stud member is fully applied to the anchor member.

5. An anchor member, as defined in claim 4, which includes internal annular means restricting said bore means in said head portion, said annular means being engageable with said legs of a stud member for resisting withdrawal of the stud member from the anchor member.

6. An anchor member, as defined in claim 4, wherein said abutment means includes a plurality of ribs spaced circumferentially around and extending longitudinally of said bore means, adjacent rib means being spaced apart sufficiently to enable the entry of a stud member leg therebetween.

7. An anchor member, as defined in claim 4, wherein said shank portion has a closed entering end which seals said bore means against the passage of any foreign material therethrough, said shank portion shoulder means being circumferentially continuous for sealingly engaging a workpiece to resist the passage of foreign material through a workpiece aperture, and said head portion presenting a radially limited annular surface for sealing engagement with a workpiece for further restraining the passage of foreign material through a workpiece aperture.

References Cited in the file of this patent

UNITED STATES PATENTS

| | | |
|---|---|---|
| 2,446,661 | Murdock | Aug. 10, 1948 |
| 2,730,154 | Aspey | Jan. 10, 1956 |

FOREIGN PATENTS

| | | |
|---|---|---|
| 165,424 | Australia | Sept. 29, 1955 |
| 191,817 | Great Britain | Jan. 17, 1923 |